(12) United States Patent
Irudayaraj et al.

(10) Patent No.: US 8,331,028 B2
(45) Date of Patent: Dec. 11, 2012

(54) LIGHT SHELF FOR BUILDINGS

(75) Inventors: Prashanth Irudayaraj, Atlanta, GA (US); Gregory McKenna, Cumming, GA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 13/451,762

(22) Filed: Apr. 20, 2012

(65) Prior Publication Data

US 2012/0268825 A1  Oct. 25, 2012

Related U.S. Application Data

(60) Provisional application No. 61/477,753, filed on Apr. 21, 2011.

(51) Int. Cl.
*G02B 17/00* (2006.01)
(52) U.S. Cl. .............................. 359/591; 359/596; 52/78
(58) Field of Classification Search .................. 359/591, 359/596; 52/473, 78
See application file for complete search history.

(56) References Cited

U.S. PATENT DOCUMENTS

| | | | |
|---|---|---|---|
| 3,334,454 A * | 8/1967 | Abrams | 52/78 |
| 7,940,460 B2 | 5/2011 | Braunstein et al. | |
| 8,116,004 B2 * | 2/2012 | Griffiths | 359/591 |
| 8,256,167 B2 * | 9/2012 | Braybrook | 52/78 |
| 2012/0243236 A1 * | 9/2012 | Schoeb et al. | 359/596 |

FOREIGN PATENT DOCUMENTS

DE            3703641 A  *  8/1988

* cited by examiner

*Primary Examiner* — Christopher Mahoney
(74) *Attorney, Agent, or Firm* — Greenberg Traurig, LLP

(57) ABSTRACT

In an embodiment, a light shelf of the present invention includes at least one panel assembly for reflecting daylight into a space; and at least two structural elements for holding the panel assembly, wherein the structural elements include a spine component having a proximal end, a distal end, and a longitudinal axis therebetween; a first mounting component for installing on a structural member and for engaging the proximal end of the spine component; a second mounting component for engaging the distal end of the spine component; and a sleeve component having at least one indentation for holding a side of the panel assembly.

23 Claims, 20 Drawing Sheets

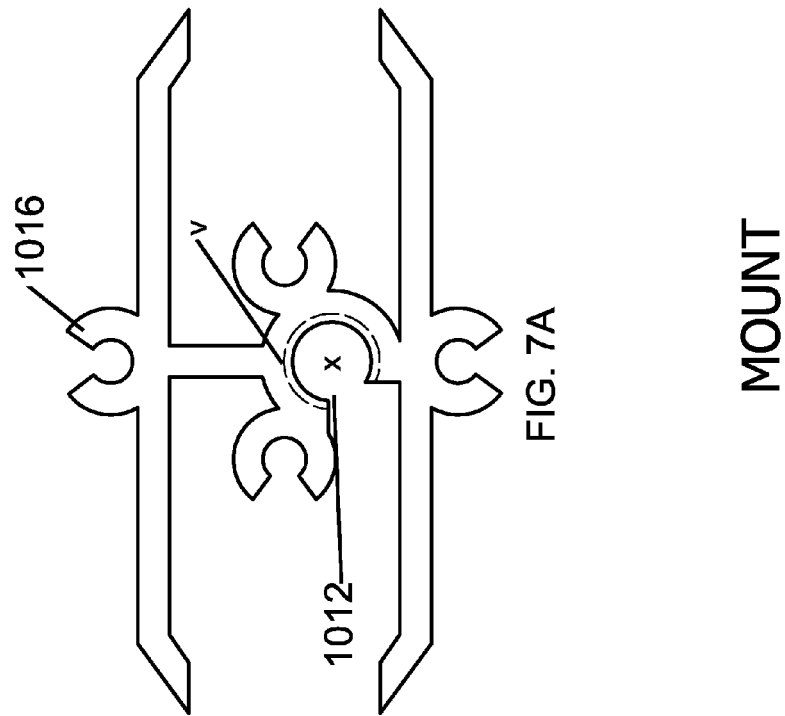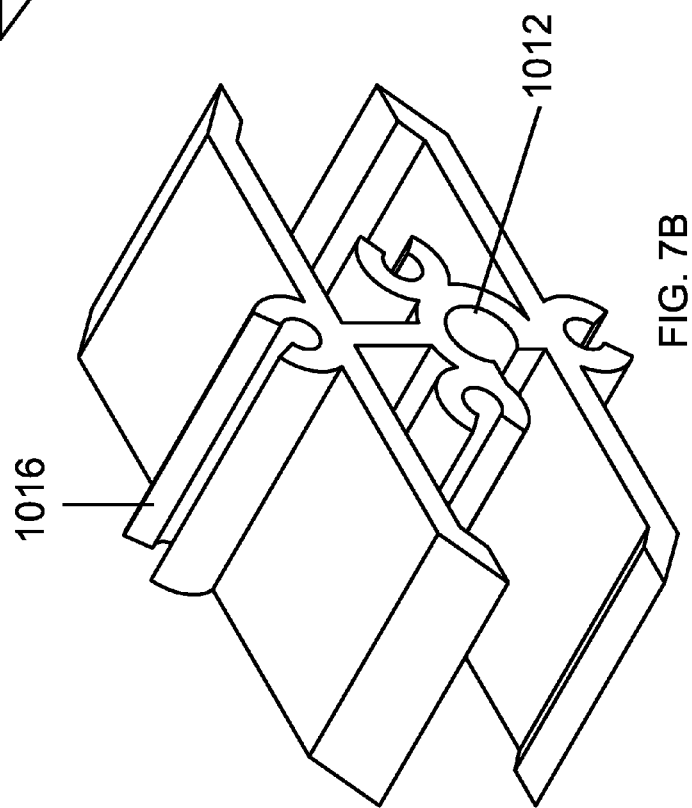

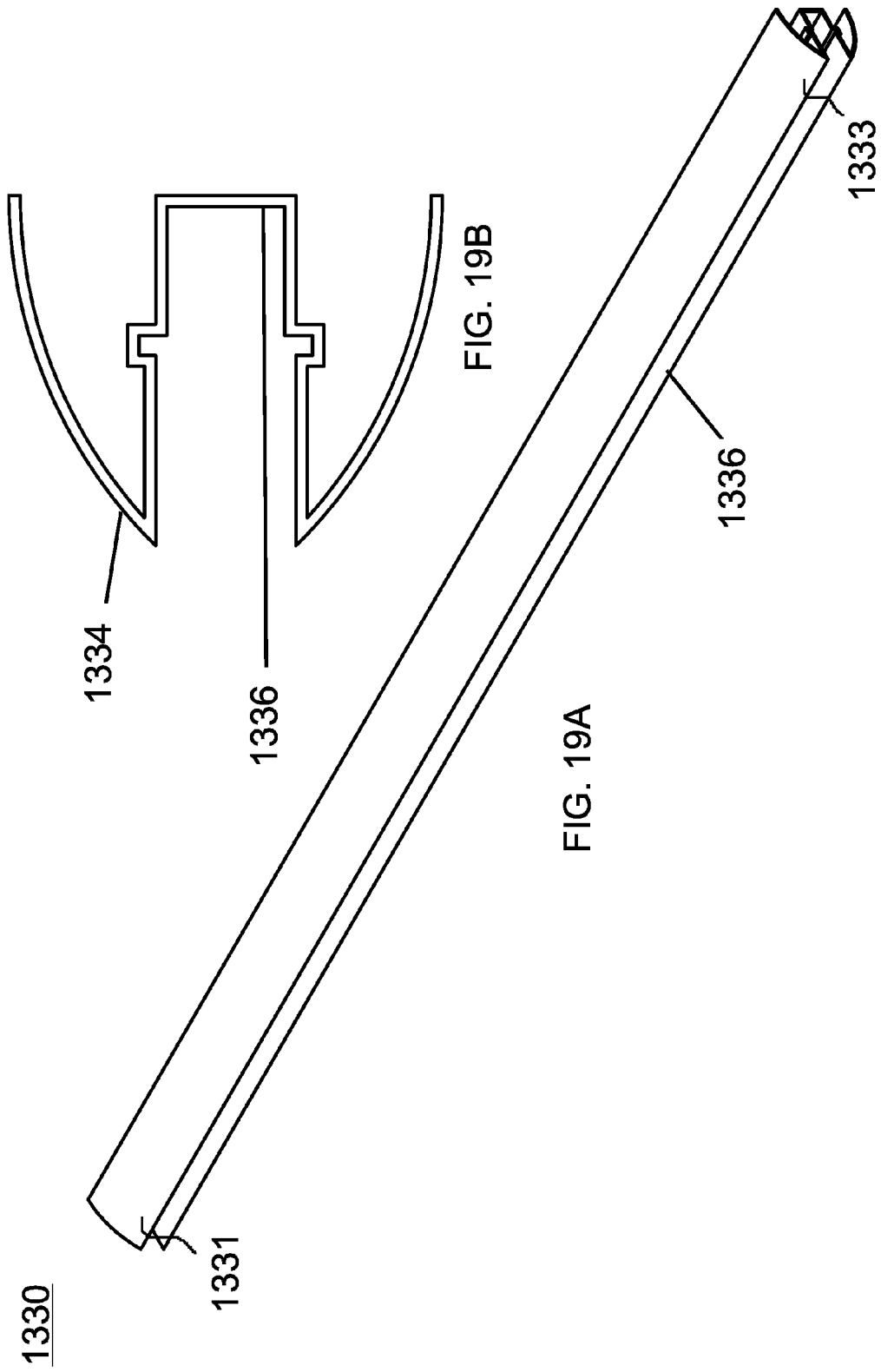

LIGHT SHELF FOR BUILDINGS

RELATED APPLICATIONS

This application claims the benefit of and priority to U.S. Provisional Application Ser. No. 61/477,753, filed Apr. 21, 2011, the entirety of this application is hereby incorporated herein by reference for the teachings therein.

BACKGROUND

Natural solar light, i.e., sunlight, is a desirable light source for interior use. Daylighting is the method of lighting a building's interior with full-spectrum, sunlight which supplements or replaces electric lighting during the daytime. There are many benefits to using daylight for illuminating areas within enclosed structures such as buildings. The use of daylight over artificial illumination for interior illumination provides a more balanced color rendering of objects which is more aesthetically pleasant and also reduces the need for energy to illuminate the interior of the building artificially. An additional benefit is the reduced amount of radiant energy produced by artificial illumination sources which can, in turn, reduce the amount of cooling needed to maintain a comfortable temperature within a building.

Interior light shelves are often used on the inside of buildings to block sunlight into a building space and "bounce" the sunlight upward and deeper into the interior space. The light shelves are attached to the interiors of the buildings and extend outward away from the buildings facade. Artificial light shelves have been proven to reduce requirements for perimeter artificial lighting, thereby conserving electrical energy costs. In many cases, architects are designing curtain wall systems where light shelves are directly integrated into the structural members of the curtain wall.

SUMMARY

According to aspects illustrated herein, in an embodiment there is disclosed a light shelf assembly that includes at least one panel assembly for reflecting daylight into a space; and at least two structural elements for holding the panel assembly, wherein the structural elements include a spine component having a proximal end, a distal end, and a longitudinal axis therebetween; a first mounting component for installing on a structural member and for engaging the proximal end of the spine component; a second mounting component for engaging the distal end of the spine component; and a sleeve component having at least one indentation for holding a side of the panel assembly.

According to aspects illustrated herein, in an embodiment there is disclosed a structural element that includes a wall mounting component for securing to an interior wall of a building, wherein the wall mounting component includes an opening with internal threads, and wherein the wall mounting component includes at least one aperture for receiving a fastener for securing the wall mounting component to the interior wall of the building; a spine component for securing to the wall mounting component, wherein the spine component includes a proximal end, a distal end and a longitudinal axis therebetween, wherein the proximal end of the spine component includes an outer surface with external threads, wherein the distal end of the spine component includes an outer surface with external threads, and wherein the proximal end of the spine component is sufficiently sized and shaped to be rotated to move along its axis through the opening of the wall mounting component; a sleeve component for slidably positioning over the spine component, wherein the sleeve component is sufficiently designed for holding a light shelf, and wherein the sleeve component includes a proximal end, a distal end and a longitudinal axis therebetween; and a free-end mounting component for securing to the distal end of the spine component, wherein the free-end mounting component includes an opening with internal threads, wherein the free-end mounting component includes at least one aperture, and wherein the distal end of the spine component is sufficiently sized and shaped to be rotated to move along its axis through the opening of the free-end mounting component.

According to aspects illustrated herein, in an embodiment there is disclosed a light shelf assembly that includes at least two wall mounting components each of which is capable of securing to an interior wall of a building, wherein each wall mounting component includes an opening with internal threads, and wherein each wall mounting component includes at least one aperture for receiving a fastener for securing the wall mounting component to the interior wall of the building; at least two spine components each of which is capable of securing to one of the wall mounting components, wherein each spine component includes a proximal end, a distal end and a longitudinal axis therebetween, wherein the proximal end of each spine component includes an outer surface with external threads, wherein the distal end of each spine component includes an outer surface with external threads, and wherein the proximal end of each spine component is sufficiently sized and shaped to be rotated to move along its axis through the opening of one of the wall mounting components; at least one light shelf; at least two sleeve components for slidably positioning over each of the spine components, wherein each of the sleeve components is sufficiently designed for holding the light shelf, and wherein each of the sleeve components includes a proximal end, a distal end and a longitudinal axis therebetween; and at least two free-end mounting components each of which is capable of securing to the distal end of one of the spine components, wherein each free-end mounting component includes an opening with internal threads, wherein each free-end mounting component includes at least one aperture, and wherein the distal end of each spine component is sufficiently sized and shaped to be rotated to move along its axis through the opening of one of the free-end mounting components.

According to aspects illustrated herein, in an embodiment there is disclosed a method of installing a light shelf assembly that includes securing a first wall mounting component to an interior wall of a building, wherein the first wall mounting component includes an internally threaded opening; rotating a threaded proximal end of a first spine component into the threaded opening of the first wall mounting component to secure the first spine component to the wall mounting component; securing a first free-end mounting component to a threaded distal end of the first spine component, wherein the first free-end mounting component includes an internally threaded opening and at least one aperture; positioning a first sleeve component over the first spine component, wherein the first sleeve component includes an indentation sufficiently designed to hold a first side surface of a light shelf; securing a second wall mounting component to an interior wall of a building, wherein the second wall mounting component includes an internally threaded opening; rotating a threaded proximal end of a second spine component into the threaded opening of the second wall mounting component to secure the second spine component to the wall mounting component; securing a second free-end mounting component to a threaded distal end of the second spine component, wherein the second free-end mounting component includes an internally threaded opening and at least one aperture; positioning a second sleeve component over the second spine component, wherein the second sleeve component includes an indentation sufficiently designed to hold a second side surface of a light shelf; slidably positioning a first side surface and a second side surface of a light shelf in the indentations of the first sleeve component and the second sleeve component such that a back edge surface of the light shelf is disposed flush against the interior wall of the building; positioning a first end cap component at a distal end of the first sleeve component, wherein the first end cap component includes at least one aperture; rotating at least one first fastener through the at least one aperture of the first end cap and into the at least one aperture of the first free-end mounting component; tightening the at least one first fastener to create a pulling tensile force on the first spine component and a pushing compressive force on the first end cap component, which in turn pushes on the first sleeve component creating compression in the first sleeve component; rotating at least one second fastener through the at least one aperture of the second end cap and into the at least one aperture of the second free-end mounting component; and tightening the at least one second fastener to create a pulling tensile force on the second spine component and a pushing compressive force on the second end cap component, which in turn pushes on the second sleeve component creating compression in the second sleeve component.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

FIGS. 7A and 7B depict a perspective view (FIG. 7A) and a front view (FIG. 7B) of an illustrative embodiment of a mount component of the structural element of FIG. 6.

FIGS. 19A and 19B depict a perspective view (FIG. 19A) and a front view (FIG. 19B) of an illustrative embodiment of a jamb sleeve component of the structural element of FIG. 1 or FIG. 6.

Figure 1:
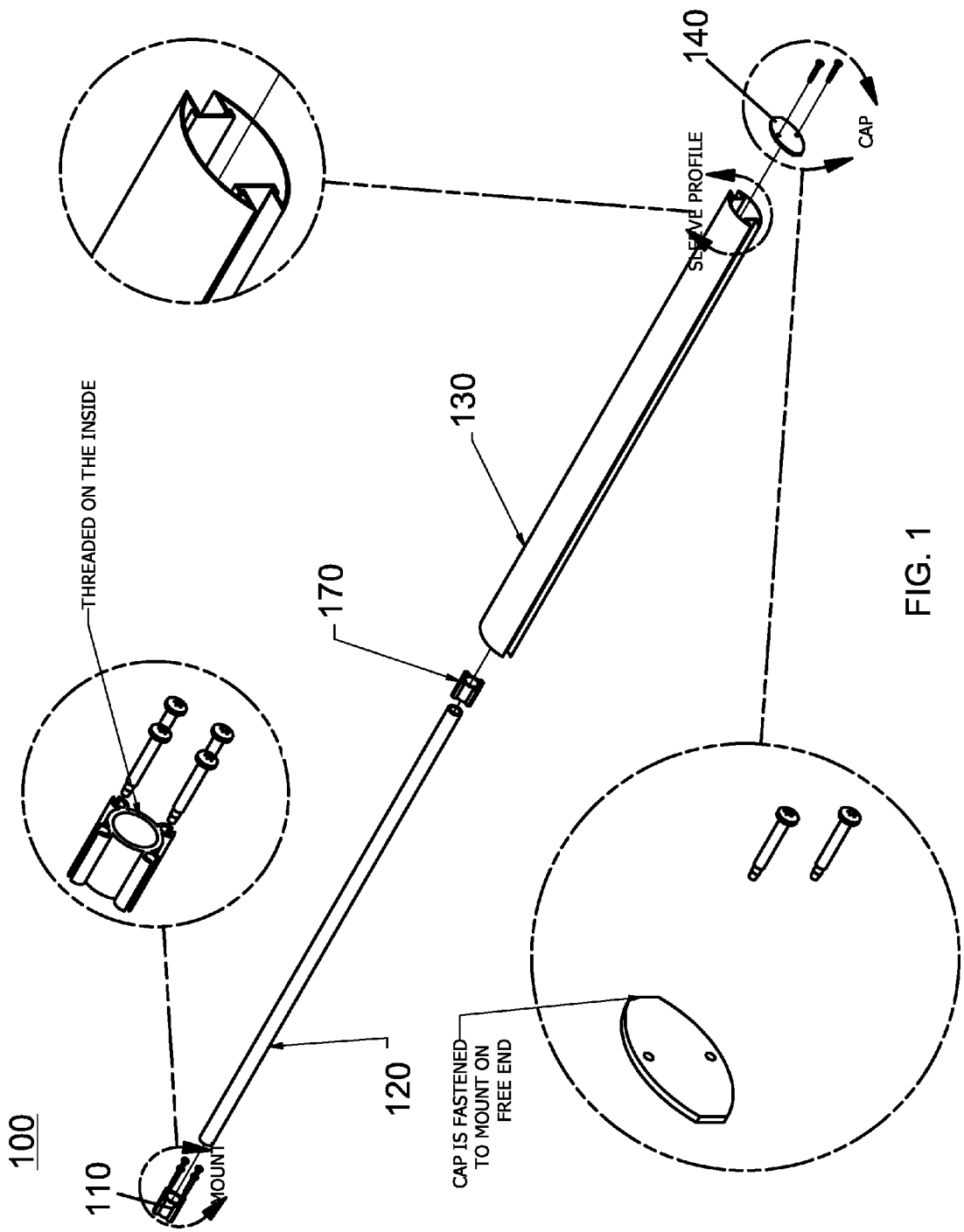
FIG. 1 depicts a perspective exploded view of an illustrative embodiment of various components of a structural element for a light shelf of the present invention.

While the above-identified drawings set forth presently disclosed embodiments, other embodiments are also contemplated, as noted in the discussion. This disclosure presents illustrative embodiments by way of representation and not limitation.

DETAILED DESCRIPTION

The present invention is now discussed in more detail referring to the drawings that accompany the present application. In the accompanying drawings, like and/or corresponding elements are referred to by like reference numbers.

Light shelves provide the advantage of shifting light from a window so that the light comes from a more overhead direction, improving the quality of illumination. Light shelves require direct sunlight, and provide useful daylighting of a zone that lies along the exterior wall. A light shelf disclosed herein can be used as an exterior or an interior shelf.

As used herein, the term "daylighting" refers to applications in which natural daylight is allowed into buildings or other structures (such as vessels or aircraft) through openings provided with means by which the amount of usable light entering through the opening is enhanced by various means. This may be achieved, for example, by diverting light from incident angles at which they would not otherwise provide useful light within the building or other structure, or by capturing light passing the opening which would not otherwise enter the building through it.

As used herein, the term "channeling of light" refers to the redirection of light (e.g., sunlight) to the inside of a space. The channeling of light provides a better distribution of light into a room (e.g., for task lighting or ambient lighting).

As used herein, the term "curtain wall" refers to a building facade, typically spanning multiple floors, which does not carry any dead load from the building other than its own dead load.

FIG. 1 is a perspective exploded view of an illustrative embodiment of various components of a structural element 100 for a light shelf of the present invention. The structural element 100 includes a wall mounting component 110, a free-end mounting component 170, a spine component 120, a sleeve component 130 and an end cap 140. Various fasteners may be used to engage the various components of the structural element 100 to each other or to a structural member of a curtain wall.

Figure 2:
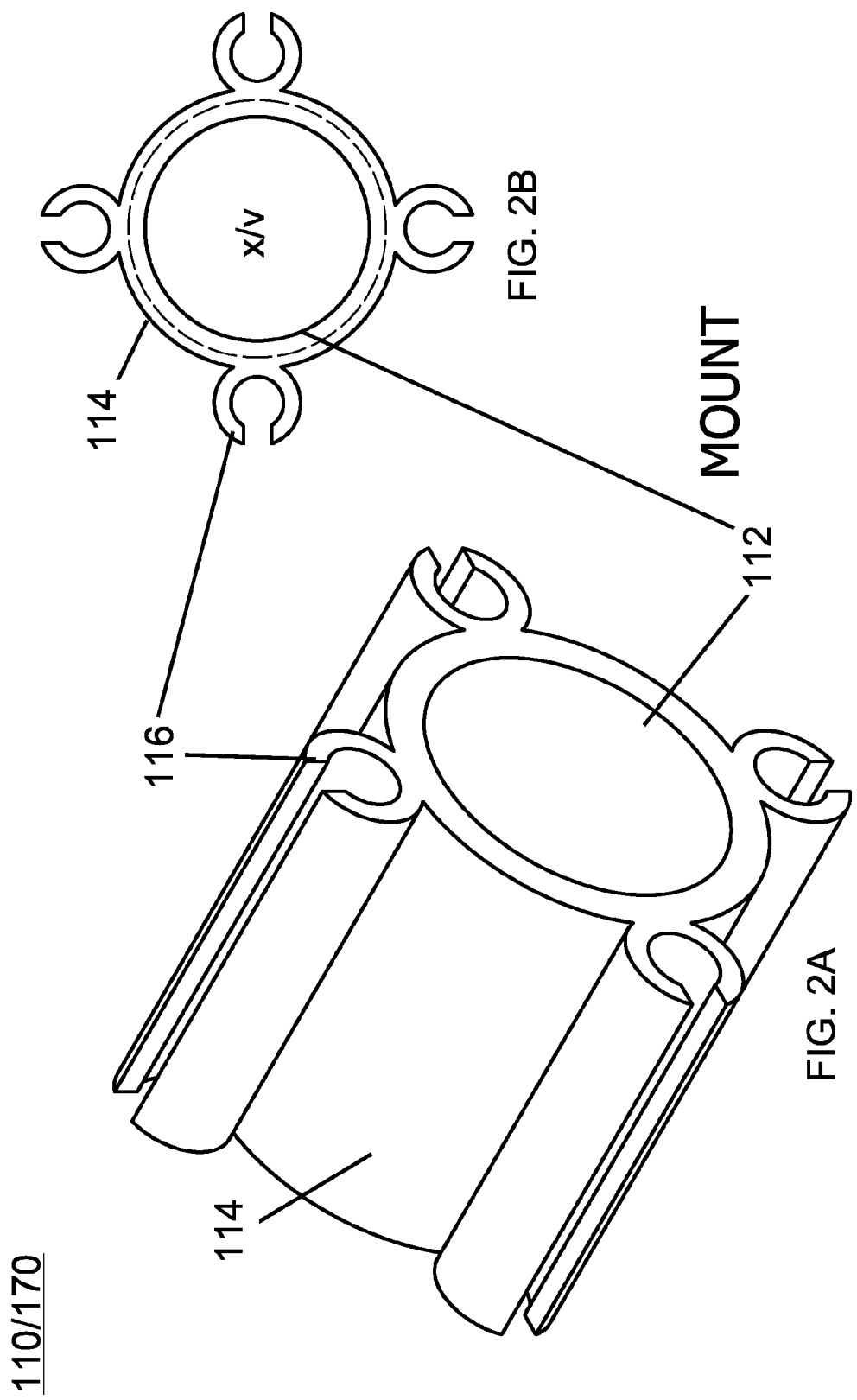
FIGS. 2A and 2B depict a perspective view (FIG. 2A) and a front view (FIG. 2B) of an illustrative embodiment of a mount component of the structural element of FIG. 1.

FIGS. 2A and 2B depict a perspective view (FIG. 2A) and a front view (FIG. 2B) of an illustrative embodiment of mount components 110/170 of the present invention. The mount component 110/170 is shaped as a simple closed curve having an outer surface 114 and an opening 112 with an inner surface. In an embodiment, the mount component 110/170 is shaped as a circle. In FIG. 2B, "x" marks the location of the center vertical position of the opening 112, which in this embodiment, is located substantially at a center vertical position "v" of the mounting component. In an embodiment, the mount component 110/170 is shaped as an ellipse. The mount component 110/170 can be fabricated from the following materials, including, but not limited to stainless steel, extruded aluminum, ABS plastic, and Polycarbonate. In an embodiment, at least a portion of the opening 112 of the mount component 110/170 has an internal thread for mating with external threads on a spine component 120 of the present invention. The outer surface 114 of the mount component 110/170 is interrupted with receiving apertures 116 for receiving fasteners. Although FIGS. 2A and 2B show four receiving apertures 116, it should be apparent that more or less receiving apertures 116 can be provided on the outer surfaces 114 as necessary for a given application.

Figure 3:
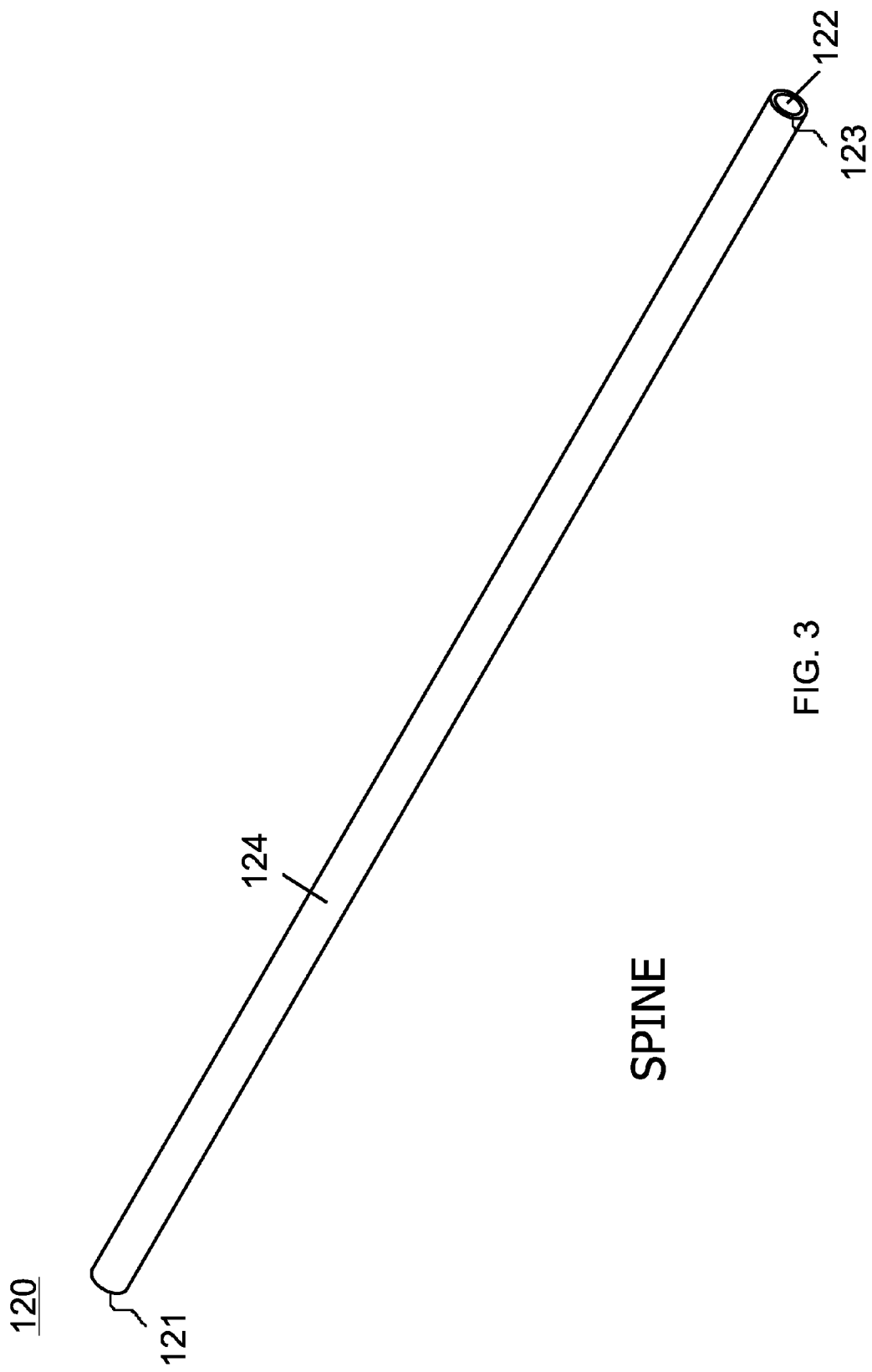
FIG. 3 depicts a perspective view of an illustrative embodiment of a spine component of the structural element of FIG. 1.

FIG. 3 is a perspective view of an illustrative embodiment of a spine component 120 of the present invention. The spine component 120 comprises a proximal end 121, a distal end 123 and a longitudinal axis therebetween. The spine component 120 can be fabricated from the following materials, including, but not limited to stainless steel, extruded aluminum, ABS plastic, and Polycarbonate. The spine component 120 has an outer closed surface 124 and an inner closed surface 122. In an embodiment, the spine component 120 is shaped as a rod having a circular cross-section. In an embodiment, at least a portion of the outer closed surface 124 of the spine component 120 has external threads for mating with internal threads on a mount component 110/170 of the present invention. In an embodiment, the spine component 120 acts as a tension rod and helps reduce or prevent sagging of a light shelf that engages a constructed structural element 100. The proximal end 121 and the distal end 123 of the spine component 120 are sufficiently designed to be threaded within and surrounded by the opening 112 of a mounting component 110 of the present invention.

Figure 4:
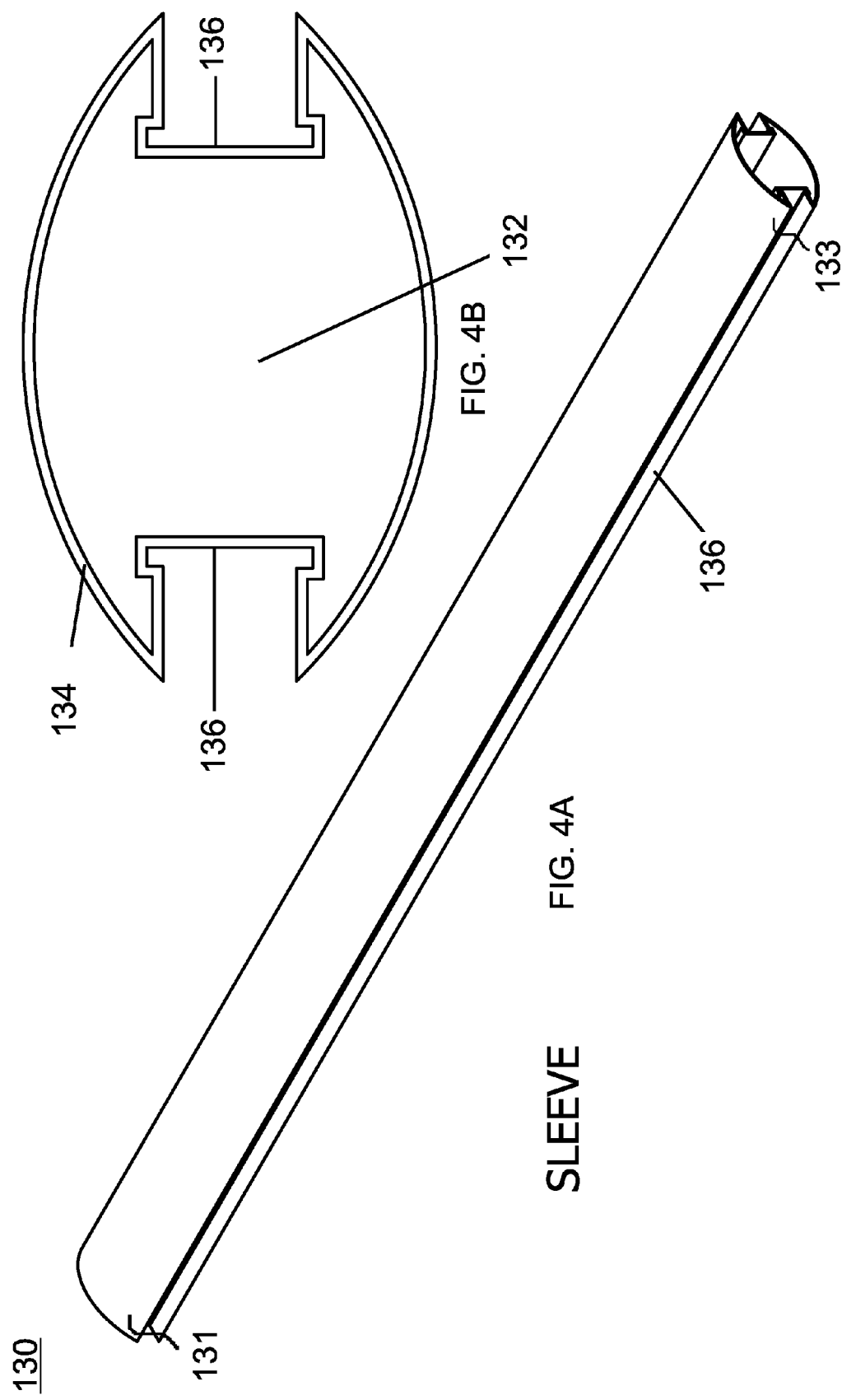
FIGS. 4A and 4B depict a perspective view (FIG. 4A) and a front view (FIG. 4B) of an illustrative embodiment of a sleeve component of the structural element of FIG. 1.
Figure 5:
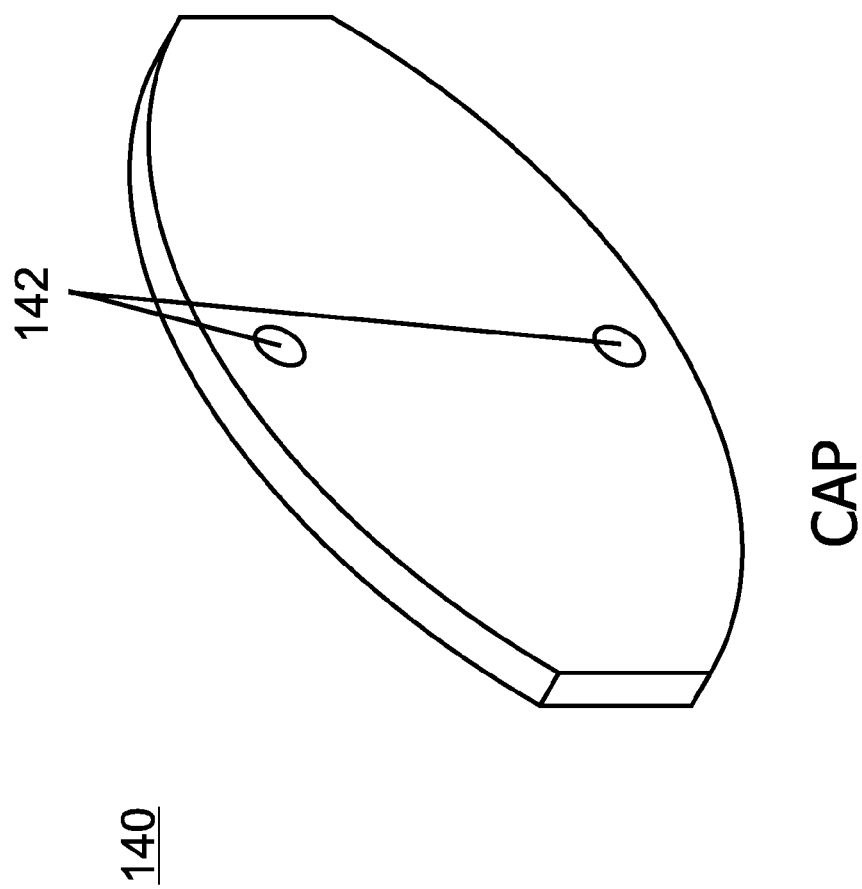
FIG. 5 depicts a perspective view of an illustrative embodiment of an end cap component of the structural element of FIG. 1.

FIGS. 4A and 4B depict a perspective view (FIG. 4A) and a front view (FIG. 4B) of an illustrative embodiment of a sleeve component 130 of the present invention. The sleeve component 130 comprises a proximal end 131, a distal end 133 and a longitudinal axis therebetween. The sleeve component 130 can be fabricated from the following materials, including, but not limited to stainless steel, extruded aluminum, ABS plastic, and Polycarbonate. The sleeve component 130 is hollowed out to include a hollowed out area 132 sufficiently designed to fit over the spine component 120 of the structural element 100. The sleeve component 130 comprises at least one indentation 136 on a side surface. The at least one indentation 136 is sufficiently designed to hold a panel assembly, such as a light reflecting panel. The sleeve component 130 comprises a face 134 for attaching an end cap component 140, as illustrated in FIG. 5. The end cap component 140 can be fabricated from the following materials, including, but not limited to stainless steel, extruded aluminum, ABS plastic, and Polycarbonate. The end cap component 140 fits over the face 134 and may be connected to the face 134 via fasteners that pass through holes 142 and into receiving apertures 116 of the free-end mount component 170 of the present invention. The sleeve component 130 is a structural component. The screws in the end cap component 140 are tightened, the pull on the spine component 120 (creating tension) and push on the end cap component 140, which in turn pushes on the sleeve component 130 (creating compression in the sleeve). This marriage of tension and compression should allow the light shelf to have a greater projection into the room or carry a larger panel load.

Figure 6:
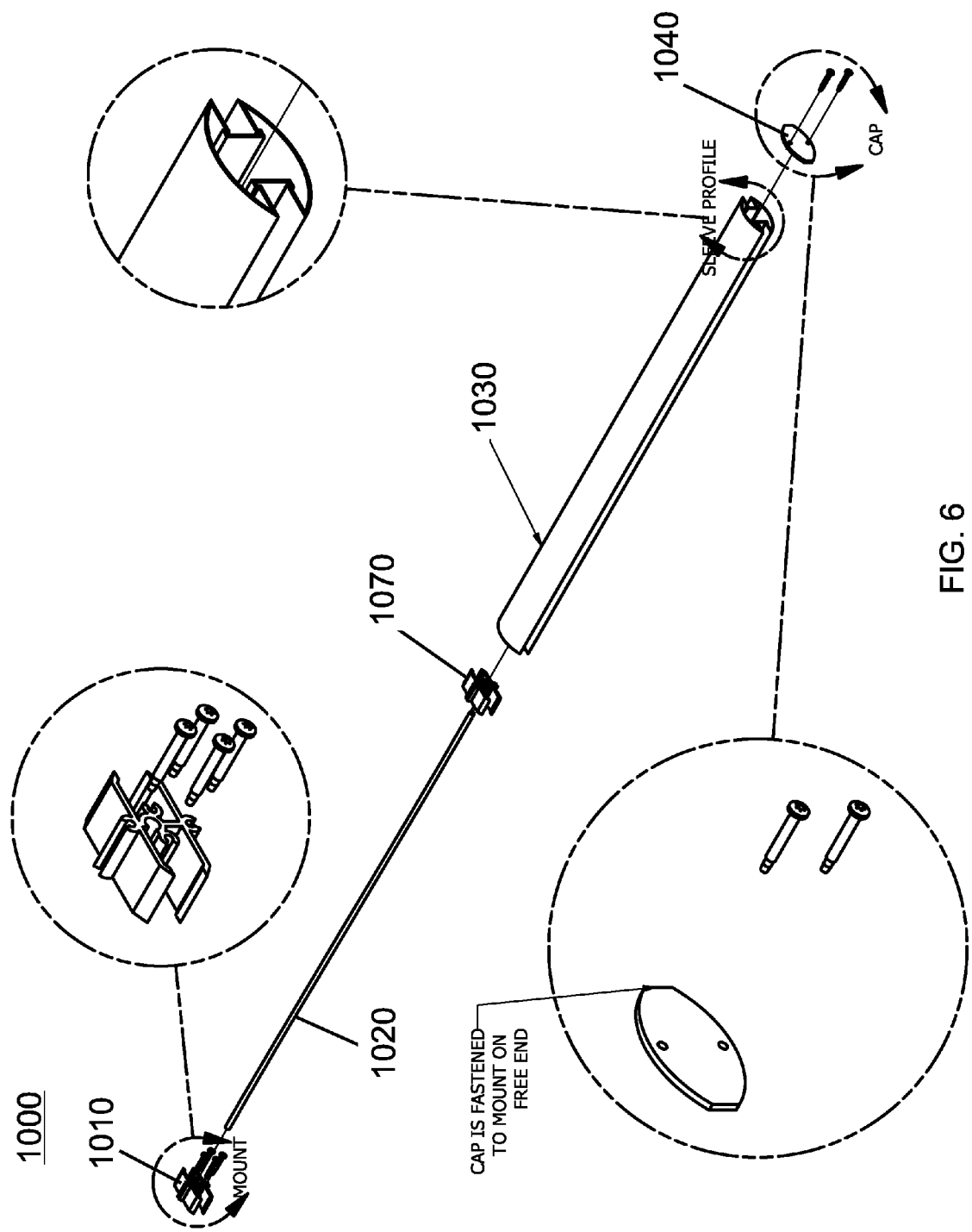
FIG. 6 depicts a perspective exploded view of an illustrative embodiment of various components of a structural element for a light shelf of the present invention.

FIG. 6 is a perspective exploded view of an illustrative embodiment of various components of a structural element 1000 for a light shelf of the present invention. The structural element 1000 includes a wall mounting component 1010, free-end mounting component 1070, a spine component 1020, a sleeve component 1030 and an end cap 1040. Various fasteners may be used to engage the various components of the structural element 1000 to each other or to a structural member of a curtain wall.

FIGS. 7A and 7B depict a perspective view (FIG. 7A) and a front view (FIG. 7B) of an illustrative embodiment of mount components 1010/1070 of the present invention. The mount component 1010/1070 can be fabricated from the following materials, including, but not limited to stainless steel, extruded aluminum, ABS plastic, and Polycarbonate. The mount component 1010/1070 has an opening 1012 with internal threads for mating with external threads on the spine component 1020 of the present invention. In FIG. 7A, "x" marks the location of the center vertical position of the opening 112, which in this embodiment, is located offset from a center vertical position "v" of the mounting component. As illustrated in FIGS. 7A and 7B, the opening 1012 is offset from the center of the mount component 1010/1070. In an embodiment, the offset creates a vertical force component on the structure as the end cap 1040 is tightened and creates tension in the spine component 1020. This force can help overcome sag. To create this force, the wall mount component 1010 at the mullion should have the spine attachment above the centerline, and the free-end mount component 1070 must have the spine component 1020 attachment below the centerline. The mount components 1010/1070 includes receiving apertures 1016 for receiving fasteners. Although FIGS. 7A and 7B show four receiving apertures 1016, it should be apparent that more or less receiving apertures 1016 can be provided on the outer surfaces 1014 as necessary for a given application.

Figure 8:
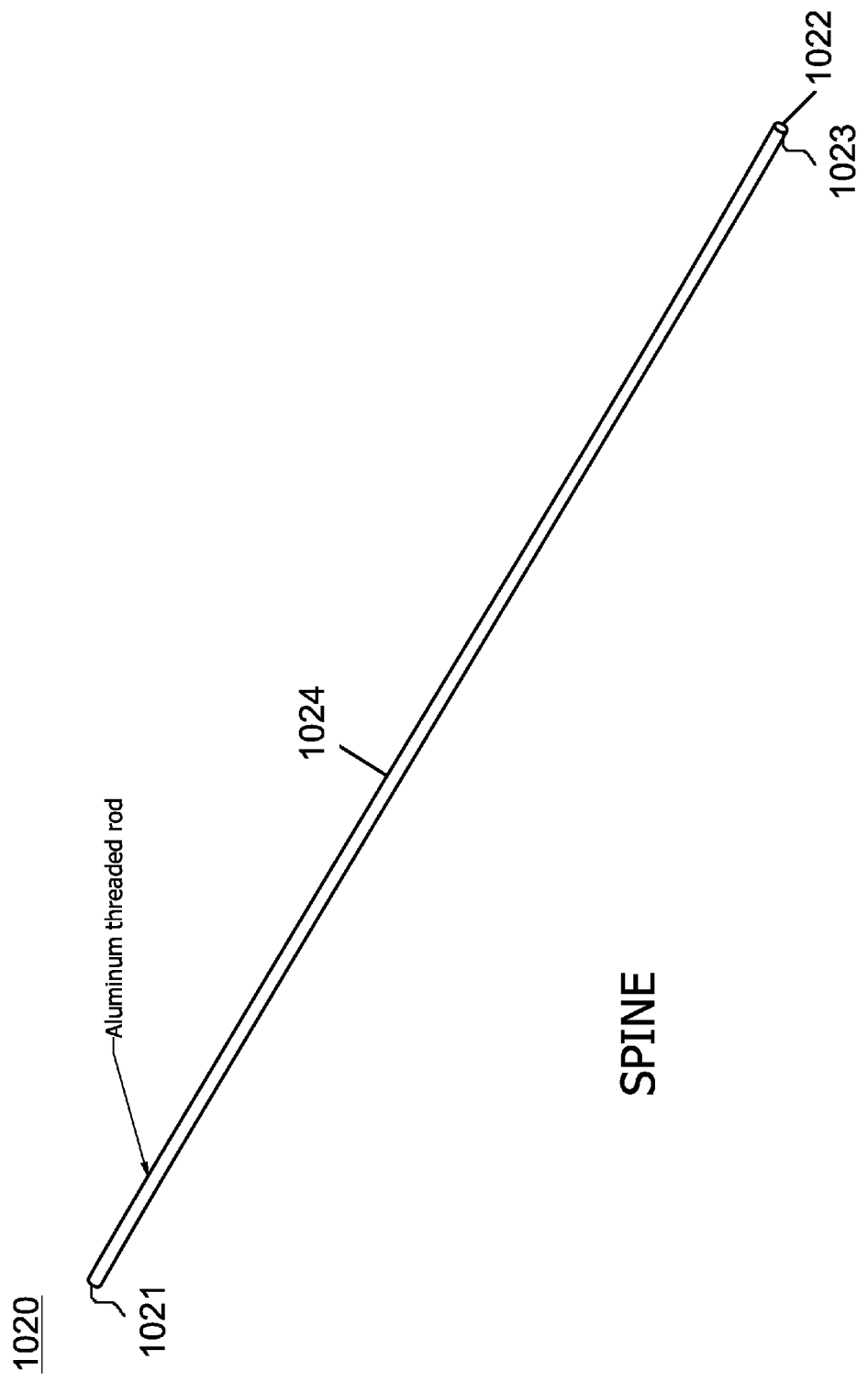
FIG. 8 depicts a perspective view of an illustrative embodiment of a spine component of the structural element of FIG. 6.

FIG. 8 is a perspective view of an illustrative embodiment of a spine component 1020 of the present invention. The spine component 1020 comprises a proximal end 1021, a distal end 1023 and a longitudinal axis therebetween. The spine component 1020 can be fabricated from the following materials, including, but not limited to stainless steel, extruded aluminum, ABS plastic, and Polycarbonate. The spine component 1020 has an outer closed surface 1024 and an inner closed surface 122. In an embodiment, the spine component 1020 is shaped as a rod having a circular cross-section. In an embodiment, at least a portion of the outer closed surface 1024 of the spine component 1020 has external threads for mating with internal threads on mount components 1010/1070 of the present invention. In an embodiment, the spine component 1020 acts as a tension rod and helps reduce or prevent sagging of a light shelf that engages a constructed structural element 1000. The proximal end 1021 and the distal end 1023 of the spine component 1020 are sufficiently designed to be positioned within and surrounded by the inner surface 1012 of mounting components 1010/1070 of the present invention.

Figure 9:
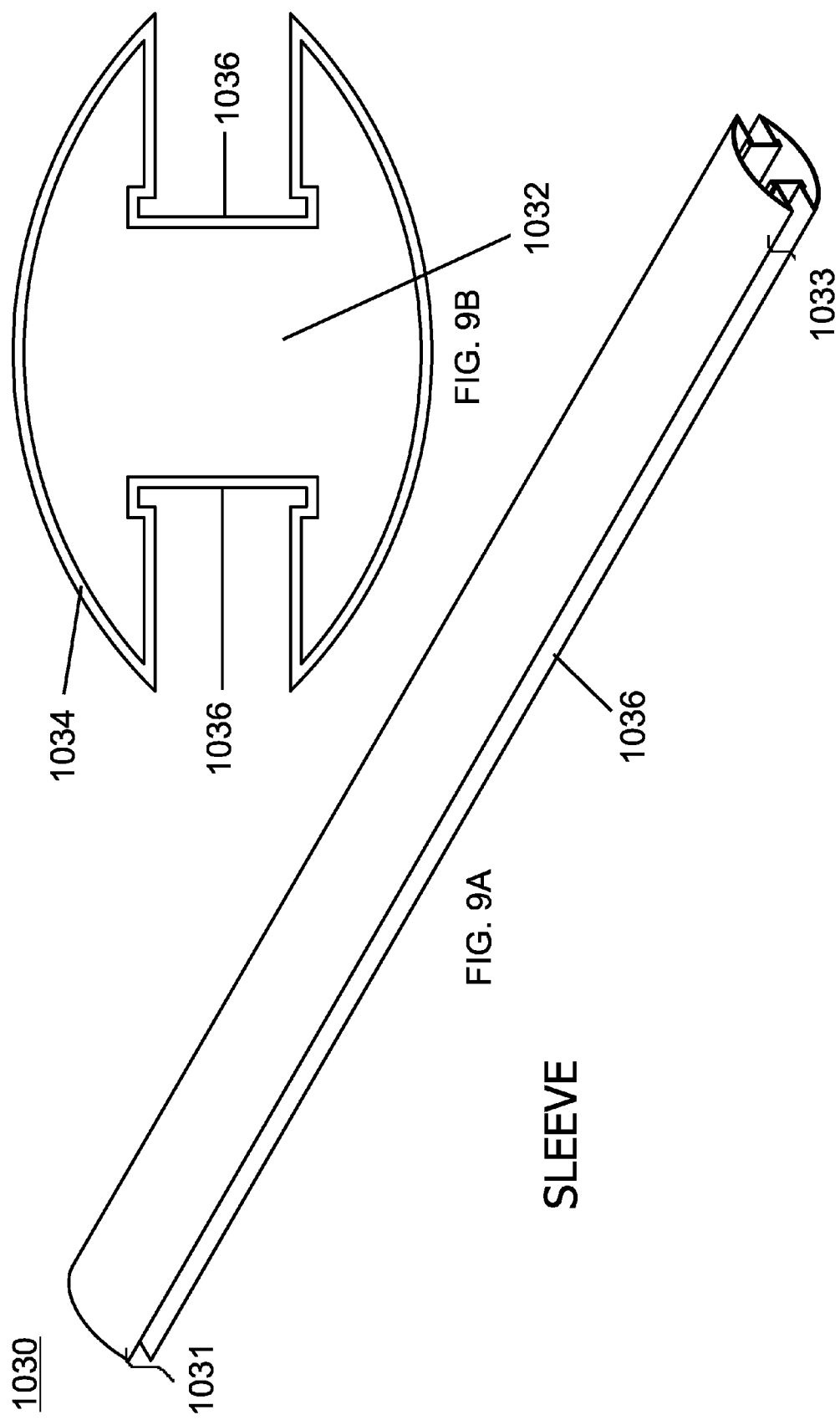
FIGS. 9A and 9B depict a perspective view (FIG. 9A) and a front view (FIG. 9B) of an illustrative embodiment of a sleeve component of the structural element of FIG. 6.
Figure 10:
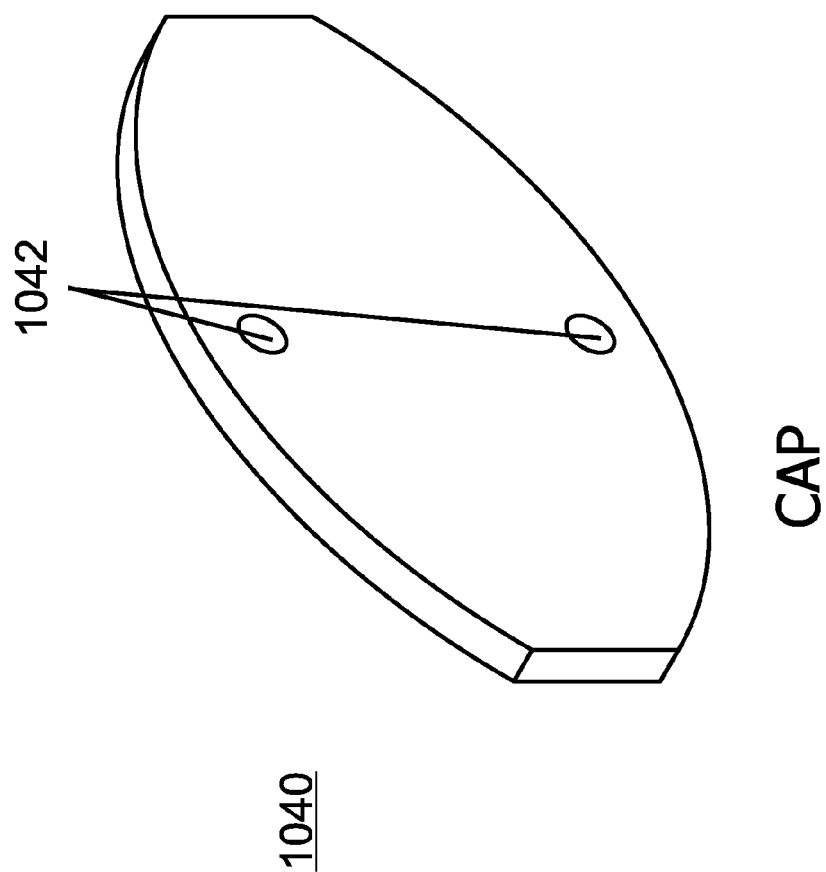
FIG. 10 depicts a perspective view of an illustrative embodiment of an end cap component of the structural element of FIG. 6.

FIGS. 9A and 9B depict a perspective view (FIG. 9A) and a front view (FIG. 9B) of an illustrative embodiment of a sleeve component 1030 of the present invention. The sleeve component 1030 comprises a proximal end 1031, a distal end 1033 and a longitudinal axis therebetween. The sleeve component 1030 can be fabricated from the following materials, including, but not limited to stainless steel, extruded aluminum, ABS plastic, and Polycarbonate. The sleeve component 1030 is hollowed out to include a hollowed out area 1032 sufficiently designed to fit over the spine component 1020 of the structural element 1000. The sleeve component 1030 comprises at least one indentation 1036 on a side surface. The at least one indentation 1036 is sufficiently designed to hold a panel assembly, such as a light reflecting panel. The sleeve component 1030 comprises a face 1034 for attaching an end cap component 1040, as illustrated in FIG. 10. The end cap component 1040 can be fabricated from the following materials, including, but not limited to stainless steel, extruded aluminum, ABS plastic, and Polycarbonate. The end cap component 1040 fits over the face 1034 and may be connected to the face 1034 via fasteners that pass through holes 1042 and into receiving apertures 1016 of free-end mount component 1070 of the present invention. The sleeve component 1030 is a structural component. When the screws in the end cap component 1040 are tightened, there is a pull on the spine component 1020 (creating tension) and a push on the end cap component 1040, which in turn pushes on the sleeve component 1030 (creating compression in the sleeve). This marriage of tension and compression should allow the light shelf to have a greater projection into the room or carry a larger panel load. The offset in the opening 1012 of the mount components 1010/1070 amplifies this effect by offsetting the proximal end 1021 and the distal end 1023 of the spine component 1020 in the vertical plane. This Δd between the two end points creates a vertical component of force, which further increases the ability to carry a larger panel load or project further into the room.

Figure 11:
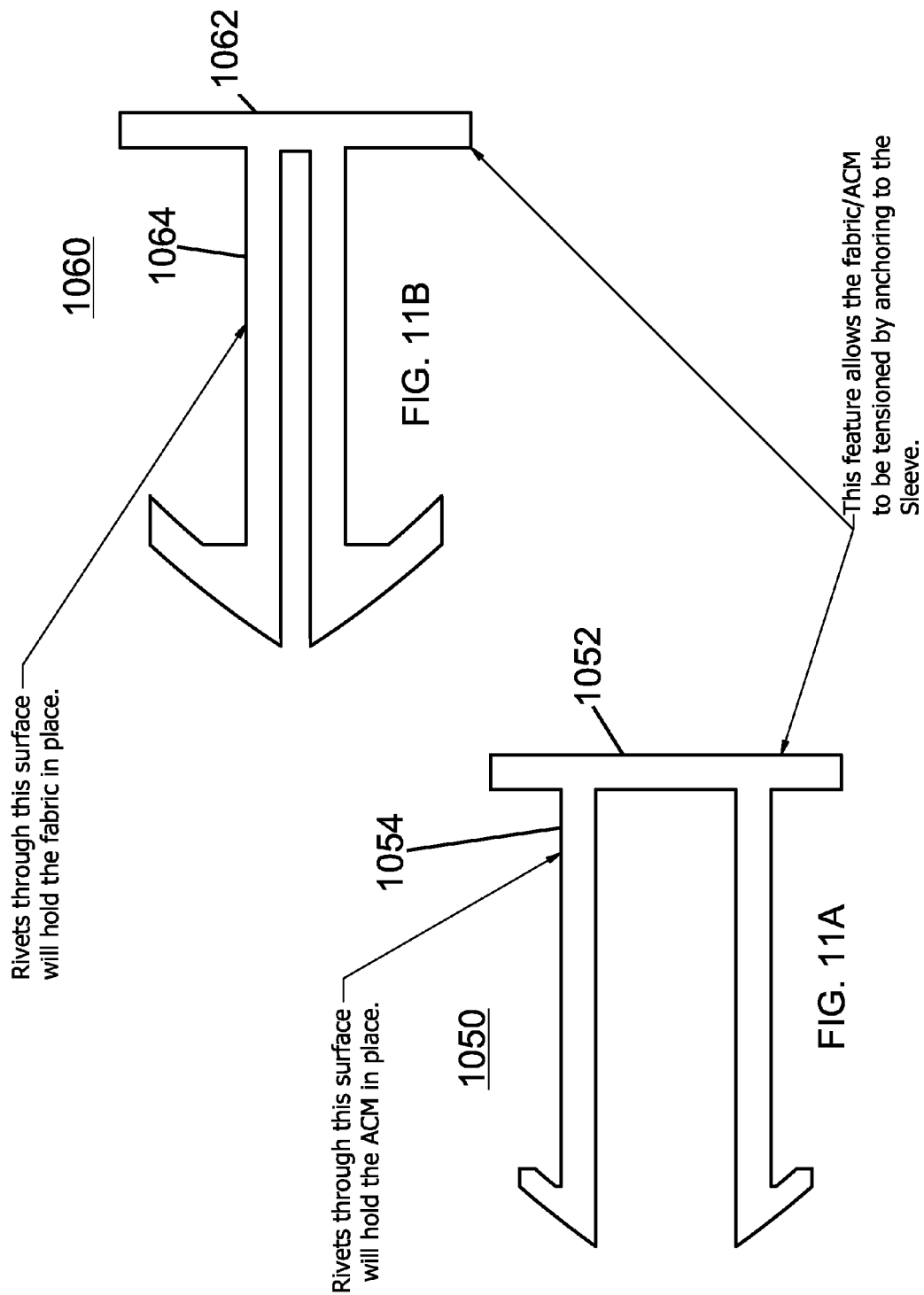
FIGS. 11A and 11B depict front views of illustrative embodiments of an ACM/Sheet metal adapter (FIG. 11A) and a fabric adapter (FIG. 11B) of the structural element of FIG. 6.

FIGS. 11A and 11B depict front views of illustrative embodiments of an ACM/Sheet metal adapter 1050 (FIG. 11A) and a fabric adapter 1060 (FIG. 11B) of the structural element of FIG. 6. The adapters 1050 and 1060 allow for different panel configurations and combinations, for example, light shelf installations with fabric, ACM, sheet metal, etc., in either homogenous or mixed configurations. ACM/Sheet metal adapter 1050 includes a backing surface 1052 which allows the light shelf to be tensioned by anchoring to the sleeve component 1030 and a top surface 1054 where rivets can be positioned to hold the light shelf in place.

Figure 12:
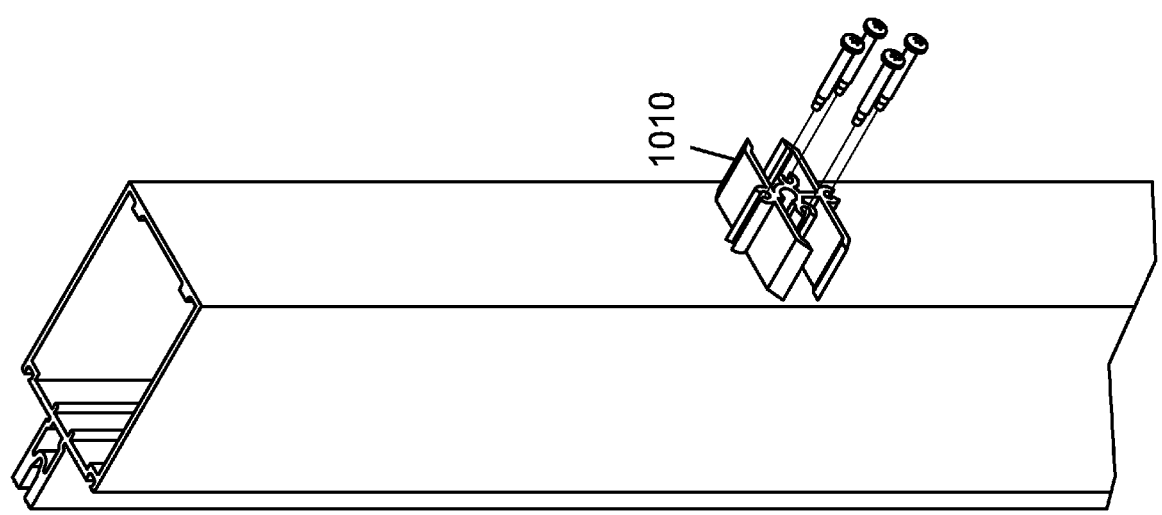
FIG. 12 depicts a cutaway perspective view of a mounting component of a structural element of the present invention being installed on a vertical structural member.
Figure 13:
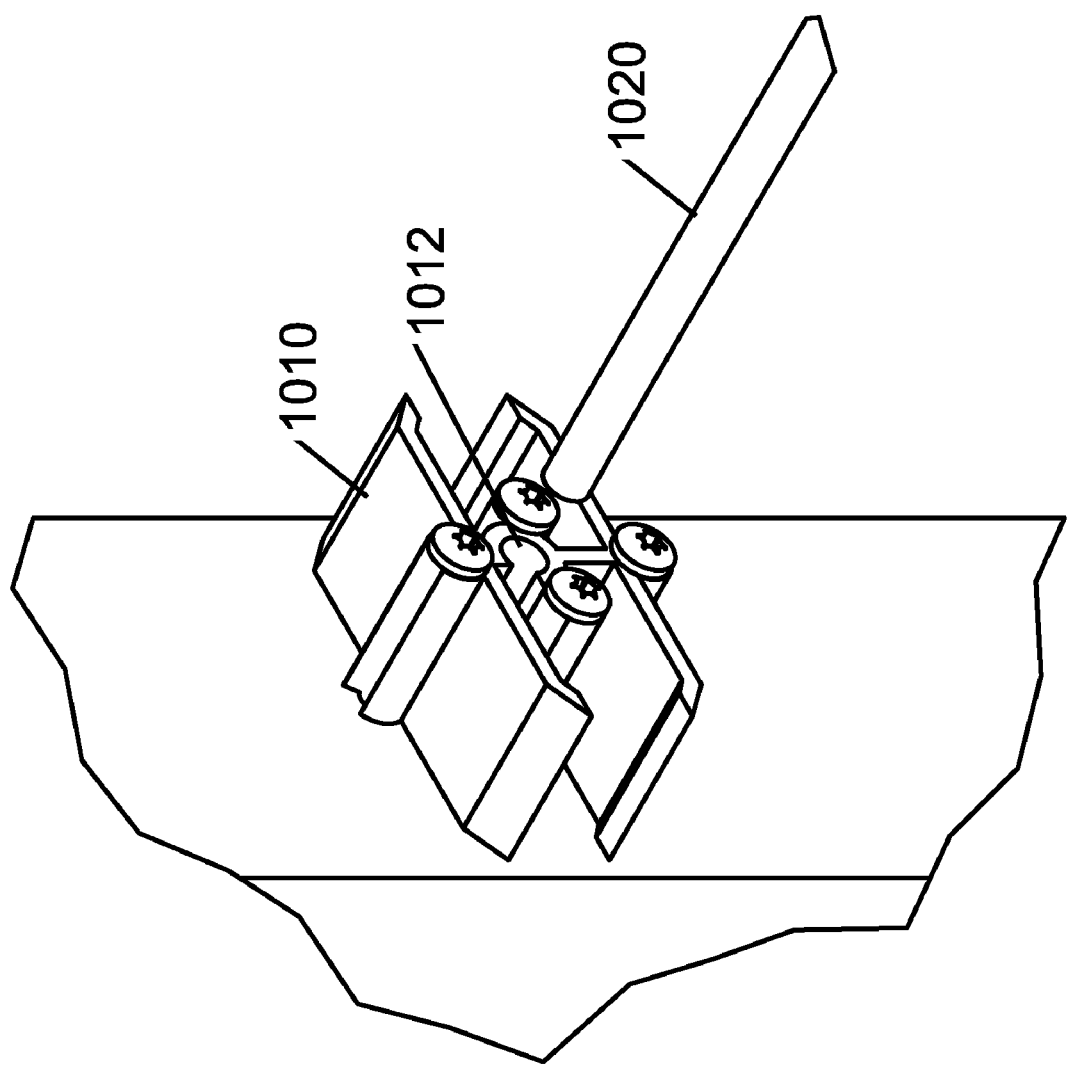
FIG. 13 depicts a cutaway perspective view of a spine component of a structural element of the present invention being installed to the mounting component of FIG. 12.
Figure 14:
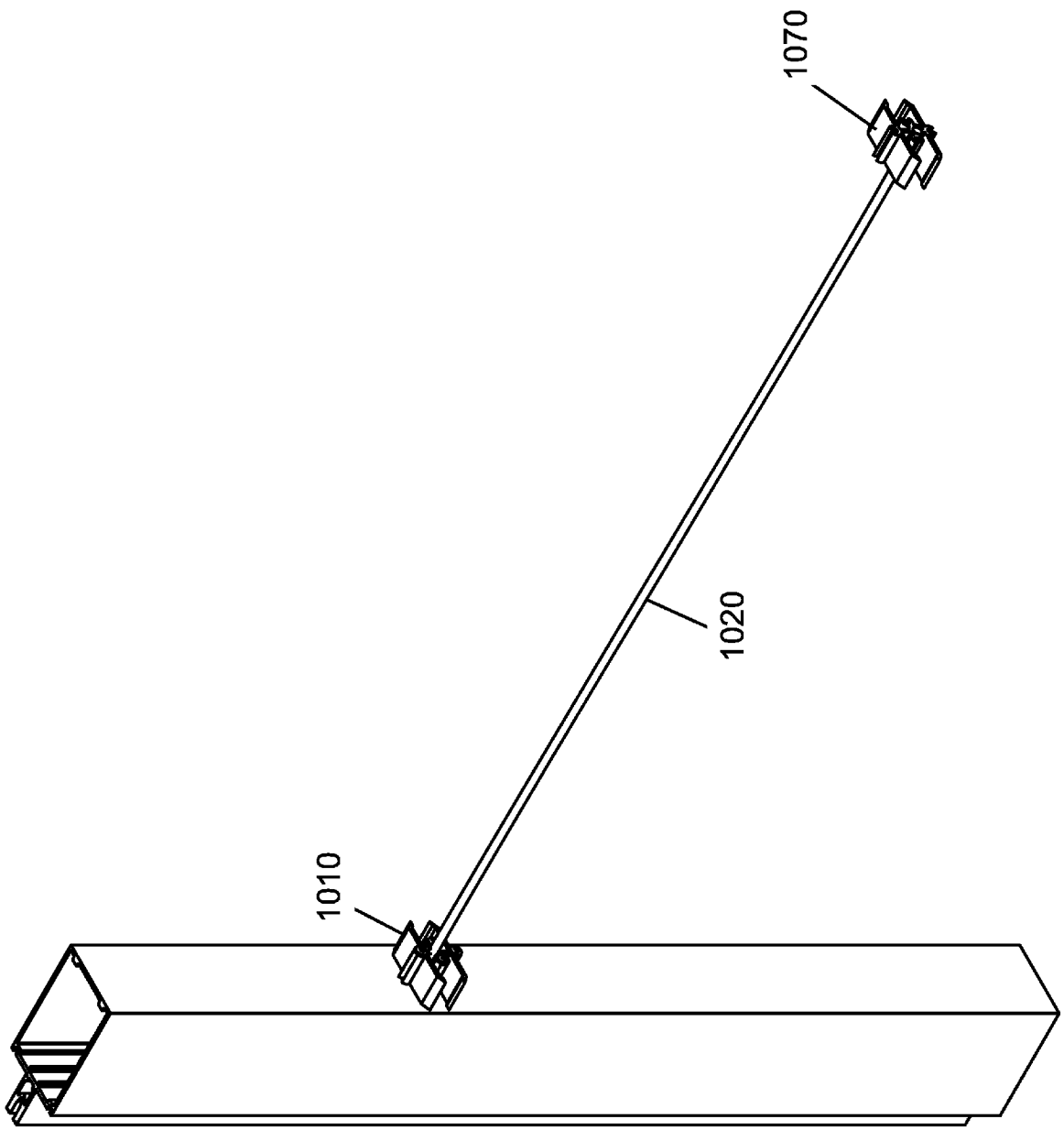
FIG. 14 depicts a perspective view of a mounting component of a structural element of the present invention being installed to the spine component of FIG. 13.

FIGS. 12-18 show an embodiment of installation steps for installing a structural element 1000 of the present invention to a structural member. In an embodiment, the structural member is part of a curtain wall. FIG. 12 shows a perspective view of a wall mounting component 1010 being installed on the structural member with the use of fasteners. FIG. 13 shows a perspective view of spine component 1020 (only partially illustrated) engaging wall mount component 1010. The proximal end 1021 of spine component 1020 has external threads 1025 for mating with internal threads 1013 in the opening 1012 of the wall mount component 1010. The spine component 1020 attaches to the wall mount component 1010 to extend out from the structural member in a perpendicular direction. FIG. 14 shows a perspective view of a free-end mounting component 1070 being engaged with the distal end 1023 of the spine component 1020. The free-end mounting component 1070 has an opening 1012 with internal threads 1013 for mating with external threads 1025 on the distal end 1023 of the spine component 1020. In an embodiment, this tensioning mechanism allows for a variety of panels with varying per sq foot weights. In an embodiment, this tensioning mechanism enables relative adjustment of adjacent panels which may be misaligned due to differences in weight.

Figure 15:
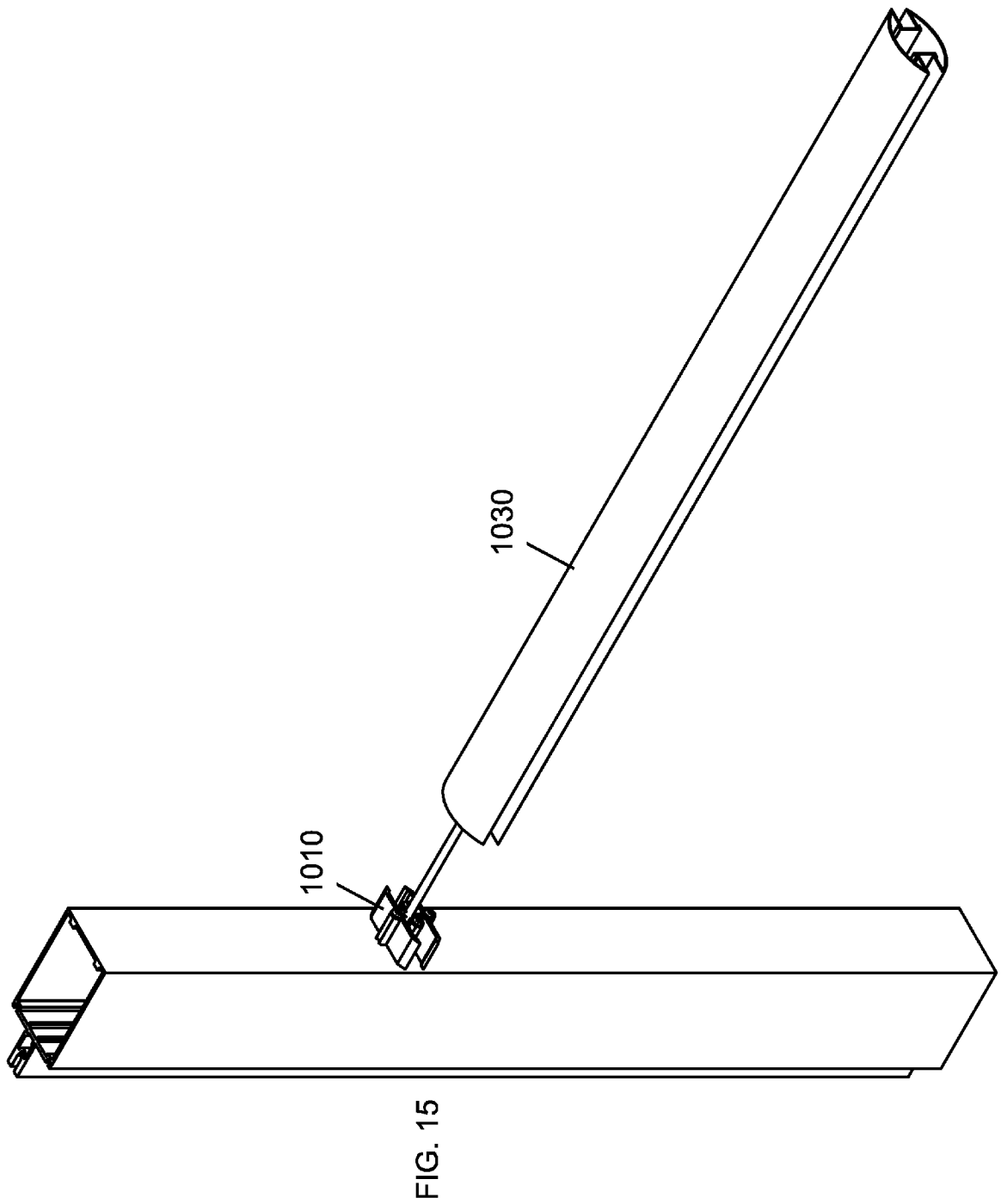
FIG. 15 depicts a perspective view of a sleeve component of a structural element of the present invention being installed over the installed components of FIG. 14.
Figure 16:
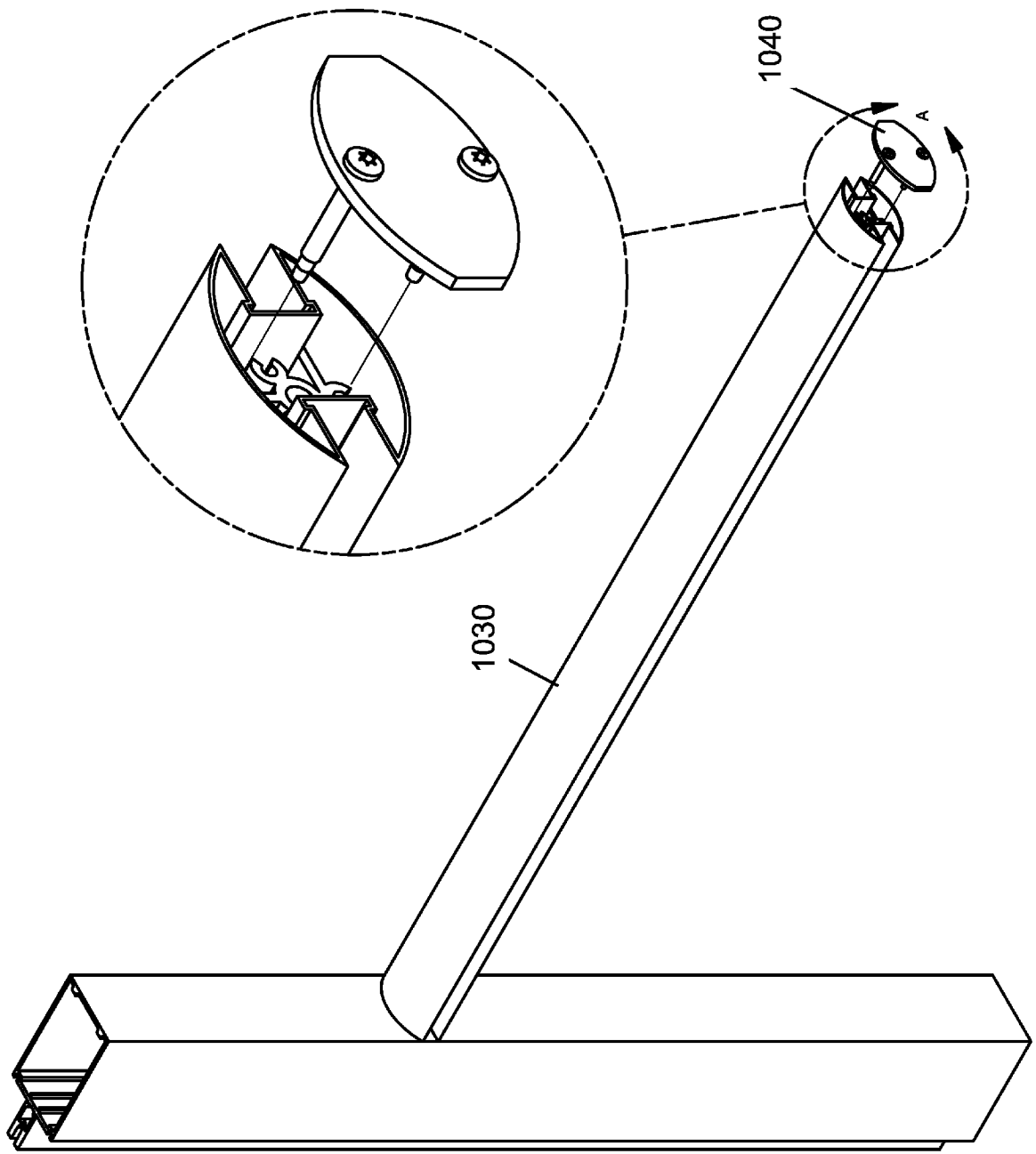
FIG. 16 depicts a perspective view of an end cap of a structural element of the present invention being installed over a face of the sleeve component of FIG. 15.
Figure 17:
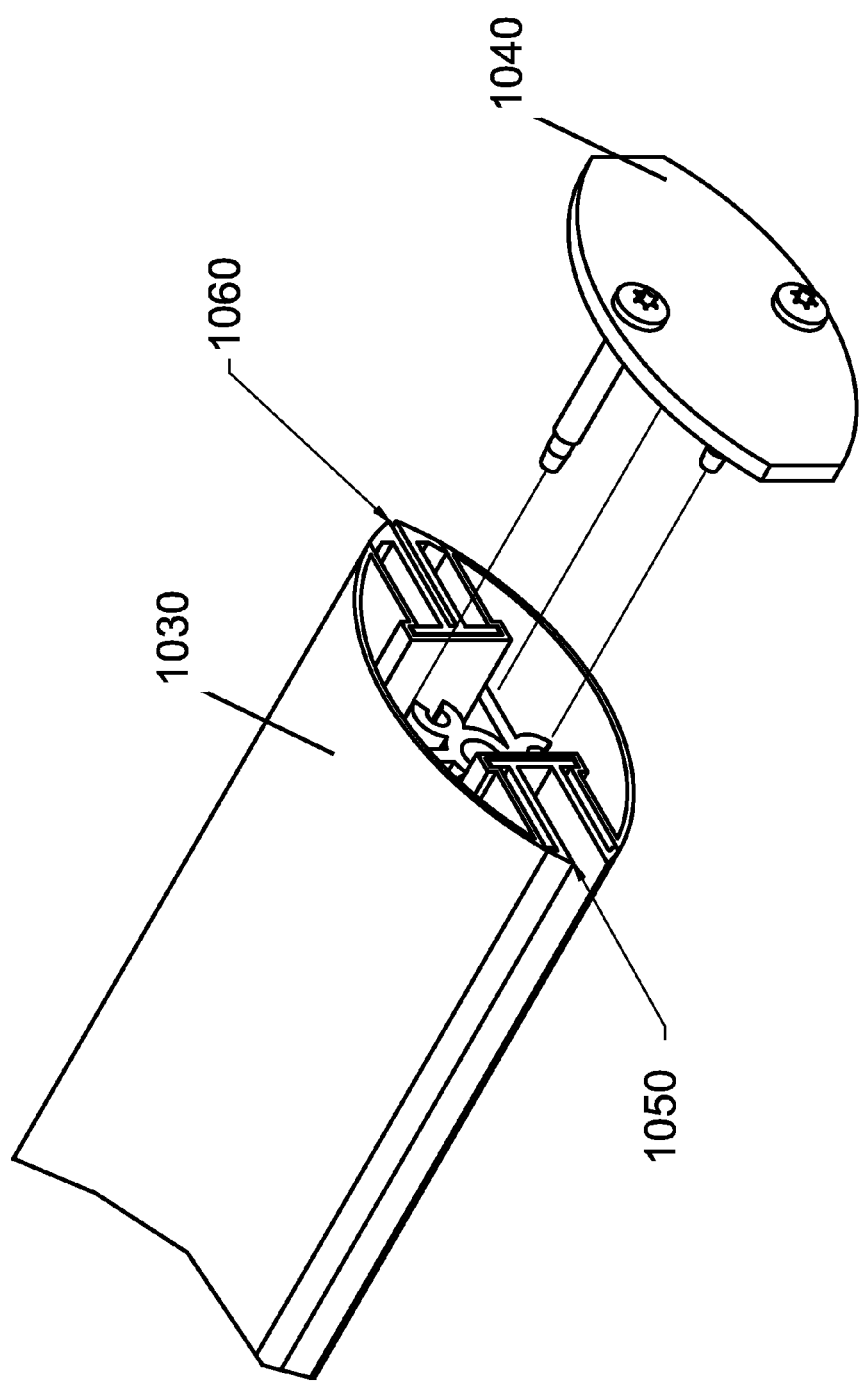
FIG. 17 depicts a partial perspective view of a distal end of the structural element of FIG. 16 showing the positioning of an ACM/Sheet metal adaptor and a fabric adaptor at a distal end of the sleeve component.
Figure 18:
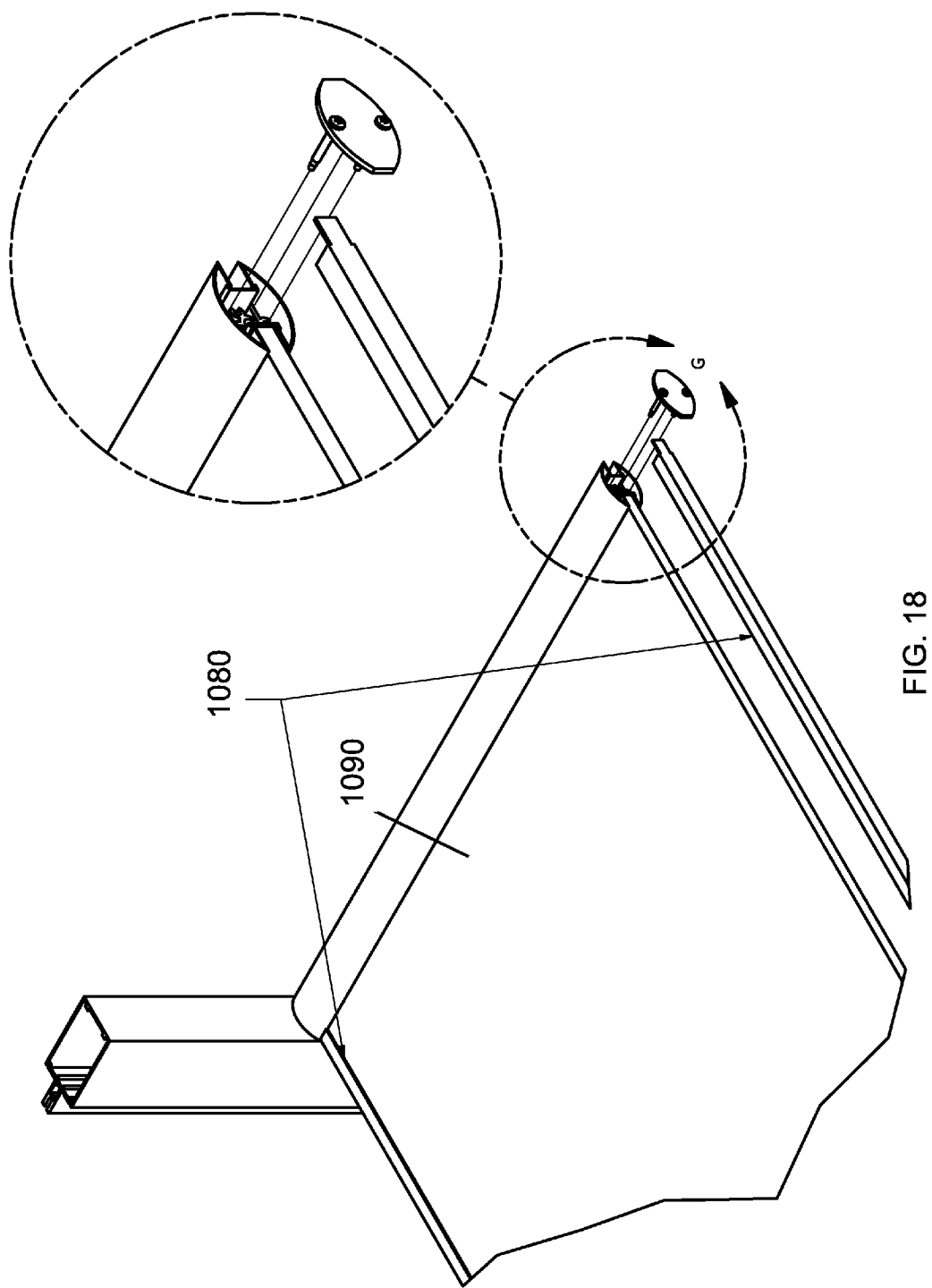
FIG. 18 depicts a partial perspective view showing the positioning of a C-channel to cap the ends of a panel assembly and to add rigidity to the panel assembly, prior to installing an end cap component over the face of the sleeve component of FIG. 16.

FIG. 15 shows a perspective view of sleeve component 1030 being positioned over the spine component 1020. The sleeve component 1030 may be positioned over the spine component 1020 to hide fasteners and provide a more aesthetic appearance compared to just a structural element 1000 with no sleeve component 1030. FIG. 16 shows the positioning of the end cap component 1040 over the face 1034 of sleeve component 1030. FIG. 17 depicts a partial perspective view of the distal end of the structural element showing the positioning of an ACM/Sheet metal adaptor 1050 and a fabric adaptor 1060 at a distal end of the sleeve component 1030. FIG. 18 depicts a partial perspective view showing the positioning of a C-channel 1080 to cap the ends of a panel assembly 1090 and to add rigidity to the panel assembly 1090, prior to installing the end cap component 1040 over the face 1034 of the sleeve component 1030 to lock the panel assembly 1090 and the sleeve component 1030 in place. Fasteners are positioned through holes 1042 and into receiving apertures 1016 of free-end mount component 1070 to secure the end cap 1040 and also, when the fasteners are turned clockwise and tightened, the fasteners push on the end cap 1040, which in turn pushes on the sleeve component 1030 (creating compression in the sleeve component 1030). This marriage of tension and compression should allow the light shelf to have a greater projection into the room or carry a larger panel load. The design of the light shelf assembly helps to distribute the loads more equally among the fasteners, as the moment is absorbed by the sleeve component 1030 which is unconnected to the mount components 1010/1070.

FIGS. 19A and 19B depict a perspective view (FIG. 19A) and a front view (FIG. 19B) of an illustrative embodiment of a jamb sleeve component 1330 of the present invention. The jamb sleeve component 1330 comprises a proximal end 1331, a distal end 1333 and a longitudinal axis therebetween. The jamb sleeve component 1330 can be fabricated from the following materials, including, but not limited to stainless steel, extruded aluminum, ABS plastic, and Polycarbonate. The jamb sleeve component 1330 comprises one indentation 1336 on a side surface and is sufficiently designed to attach with a jamb on the opposite side surface. The at least one indentation 1336 is sufficiently designed to hold a panel assembly, such as a light reflecting panel. The jamb sleeve component 1330 comprises a face 1334 for attaching an end cap component of the present invention.

Figure 20A:
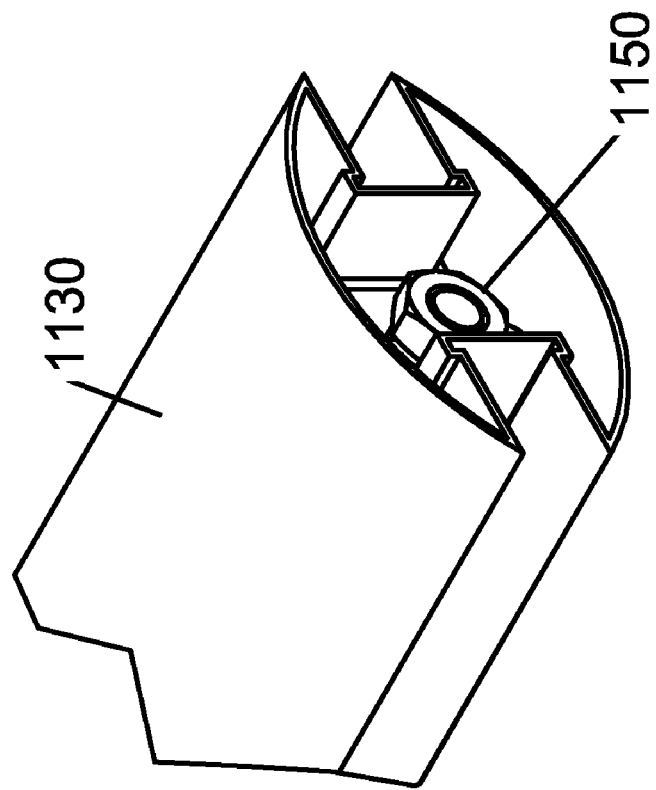
FIGS. 20A and 20B depict a partial perspective view (FIG. 20A) and a partial cutaway perspective view (FIG. 20B) of an illustrative embodiment of a free-end mounting component that is connected to a sleeve component of the present invention and slides over a spine component of the present invention.
Figure 20B:
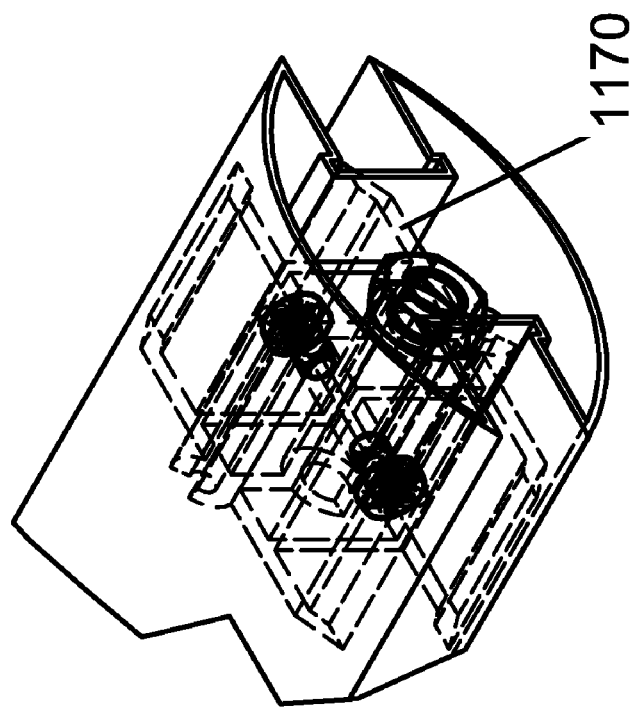

FIGS. 20A and 20B depict a partial perspective view (FIG. 20A) and a partial cutaway perspective view (FIG. 20B) of an illustrative embodiment of a free-end mounting component 1170 of the present invention that is connected to a sleeve component 1130 of the present invention and slides over a spine component (not illustrated) of the present invention. The free-end mounting component 1170 is connected to the sleeve component 1130 at the distal end, and the free-end mounting component 1170 is completely surrounded by the sleeve component 1130. In an embodiment, the free-end mounting component 1170 is attached to the sleeve component 1130 via two screws. The distal end of the spine component will protrude out through the opening of the free-end mounting component 1170 and is threaded onto a nut 1150. The nut 1150, when torqued, puts tension on the spine component by pushing against the free-end mounting component 1170 (which in turn pushes against the sleeve component 1130, which pushes against the mullion). In this embodiment, an end cap component is no longer needed to provide a role in the tensioning.

A structural element of the present invention can be used with various types of panel assemblies, including, but not limited to, panel assemblies formed from an aluminum or aluminum composite material (ACM). In an embodiment, a light shelf of the present invention serves as an interior extension to a curtain wall horizontal, reflecting sunlight deeper into the interior of a building by "bouncing" natural light up to the ceiling In an embodiment, a light shelf of the present invention serves as an interior extension to a curtain wall horizontal, diffusing sunlight to the space below the light shelf by "scattering" natural light down.

A method of installing a light shelf assembly includes securing a first wall mounting component to an interior wall of a building, wherein the first wall mounting component includes an internally threaded opening; rotating a threaded proximal end of a first spine component into the threaded opening of the first wall mounting component to secure the first spine component to the wall mounting component; securing a first free-end mounting component to a threaded distal end of the first spine component, wherein the first free-end mounting component includes an internally threaded opening and at least one aperture; positioning a first sleeve component over the first spine component, wherein the first sleeve component includes an indentation sufficiently designed to hold a first side surface of a light shelf; securing a second wall mounting component to an interior wall of a building, wherein the second wall mounting component includes an internally threaded opening; rotating a threaded proximal end of a second spine component into the threaded opening of the second wall mounting component to secure the second spine component to the wall mounting component; securing a second free-end mounting component to a threaded distal end of the second spine component, wherein the second free-end mounting component includes an internally threaded opening and at least one aperture; positioning a second sleeve component over the second spine component, wherein the second sleeve component includes an indentation sufficiently designed to hold a second side surface of a light shelf; slidably positioning a first side surface and a second side surface of a light shelf in the indentations of the first sleeve component and the second sleeve component such that a back edge surface of the light shelf is disposed flush against the interior wall of the building; positioning a first end cap component at a distal end of the first sleeve component, wherein the first end cap component includes at least one aperture; rotating at least one first fastener through the at least one aperture of the first end cap and into the at least one aperture of the first free-end mounting component; tightening the at least one first fastener to create a pulling tensile force on the first spine component and a pushing compressive force on the first end cap component, which in turn pushes on the first sleeve component creating compression in the first sleeve component; rotating at least one second fastener through the at least one aperture of the second end cap and into the at least one aperture of the second free-end mounting component; and tightening the at least one second fastener to create a pulling tensile force on the second spine component and a pushing compressive force on the second end cap component, which in turn pushes on the second sleeve component creating compression in the second sleeve component.

While illustrative embodiments of the invention are disclosed herein, it will be appreciated that numerous modifications and other embodiments may be devised by those skilled in the art. Therefore, it will be understood that the appended claims are intended to cover all such modifications and embodiments that come within the spirit and scope of the present invention.

What is claimed is:

1. A structural element comprising:
   a wall mounting component for securing to an interior wall of a building,
   wherein the wall mounting component includes an opening with internal threads, and
   wherein the wall mounting component includes at least one aperture for receiving a fastener for securing the wall mounting component to the interior wall of the building;
   a spine component for securing to the wall mounting component,
   wherein the spine component includes a proximal end, a distal end and a longitudinal axis therebetween,
   wherein the proximal end of the spine component includes an outer surface with external threads,
   wherein the distal end of the spine component includes an outer surface with external threads, and
   wherein the proximal end of the spine component is sufficiently sized and shaped to be rotated to move along its axis through the opening of the wall mounting component;
   a sleeve component for slidably positioning over the spine component,
   wherein the sleeve component is sufficiently designed for holding a light shelf, and
   wherein the sleeve component includes a proximal end, a distal end and a longitudinal axis therebetween; and
   a free-end mounting component for securing to the distal end of the spine component,
   wherein the free-end mounting component includes an opening with internal threads,
   wherein the free-end mounting component includes at least one aperture, and
   wherein the distal end of the spine component is sufficiently sized and shaped to be rotated to move along its axis through the opening of the free-end mounting component.

2. The structural element of claim 1 wherein a center vertical position of the opening of the wall mounting component is located substantially at a center vertical position of the wall mounting component, and wherein a center vertical position of the opening of the free-end mounting component is located substantially at a center vertical position of the free-end mounting component.

3. The structural element of claim 1 wherein a center vertical position of the opening of the wall mounting component is located offset from a center vertical position of the wall mounting component, and wherein a center vertical position of the opening of the free-end mounting component is located offset from a center vertical position of the free-end mounting component.

4. The structural element of claim 1 wherein the sleeve component includes at least one indentation on an external surface of the longitudinal axis, and wherein the at least one indentation is sufficiently designed to hold the light shelf.

5. The structural element of claim 1 wherein the sleeve component includes at least one indentation on an external surface of the longitudinal axis, and wherein the at least one indentation is sufficiently designed to hold an adapter for holding different light shelf configurations.

6. The structural element of claim 1 wherein the free-end mounting component is connected to the distal end of the sleeve component, and wherein the free-end mounting component is completely surrounded by the sleeve component.

7. The structural element of claim 6 wherein the distal end of the spine component is sufficiently sized and shaped to be rotated to move along its axis through the opening of the free-end mounting component, and wherein the distal end of the spine component protrudes out through the opening of the free-end mounting component and is threaded onto a nut.

8. The structural element of claim 7 wherein, when the nut is torqued, tension is placed on the spine component by pushing against the free-end mount component, which in turn pushes against the sleeve component, which pushes against the interior wall of the building.

9. The light shelf assembly of claim 8 wherein each sleeve component includes at least one indentation on an external surface of the longitudinal axis, and wherein the at least one indentation is sufficiently designed to hold the light shelf.

10. The structural element of claim 1 further comprising:
an end cap component for engaging the distal end of the sleeve component,
wherein the end cap component includes at least one aperture for receiving a fastener, and wherein the end cap component is secured to the free-end mounting component.

11. The structural element of claim 10 further comprising a plurality of fasteners.

12. The structural element of claim 11 wherein, when fasteners are positioned through the apertures of the end cap component and into the apertures of the free-end mounting component, and the fasteners are tightened, there is a pulling tensile force on the spine component and a pushing compressive force on the end cap component, which in turn pushes on the sleeve component creating compression in the sleeve component.

13. A light shelf assembly comprising:
at least two wall mounting components each of which is capable of securing to an interior wall of a building,
wherein each wall mounting component includes an opening with internal threads, and
wherein each wall mounting component includes at least one aperture for receiving a fastener for securing the wall mounting component to the interior wall of the building;
at least two spine components each of which is capable of securing to one of the wall mounting components,
wherein each spine component includes a proximal end, a distal end and a longitudinal axis therebetween,
wherein the proximal end of each spine component includes an outer surface with external threads,
wherein the distal end of each spine component includes an outer surface with external threads, and
wherein the proximal end of each spine component is sufficiently sized and shaped to be rotated to move along its axis through the opening of one of the wall mounting components;
at least one light shelf;
at least two sleeve components for slidably positioning over each of the spine components,
wherein each of the sleeve components is sufficiently designed for holding the light shelf, and
wherein each of the sleeve components includes a proximal end, a distal end and a longitudinal axis therebetween; and
at least two free-end mounting components each of which is capable of securing to the distal end of one of the spine components,
wherein each free-end mounting component includes an opening with internal threads,
wherein each free-end mounting component includes at least one aperture, and
wherein the distal end of each spine component is sufficiently sized and shaped to be rotated to move along its axis through the opening of one of the free-end mounting components.

14. The light shelf assembly of claim 13 wherein a center vertical position of the opening of each wall mounting component is located substantially at a center vertical position of the wall mounting component, and wherein a center vertical position of the opening of each free-end mounting component is located substantially at a center vertical position of the free-end mounting component.

15. The light shelf assembly of claim 13 wherein a center vertical position of the opening of each wall mounting component is located offset from a center vertical position of the wall mounting component, and wherein a center vertical position of the opening of each free-end mounting component is located offset from a center vertical position of the free-end mounting component.

16. The light shelf assembly of claim 13 wherein each sleeve component includes at least one indentation on an external surface of the longitudinal axis, and wherein the at least one indentation is sufficiently designed to hold an adapter for holding different light shelf configurations.

17. The light shelf assembly of claim 13 wherein each free-end mounting component is connected to the distal end of each sleeve component, and wherein each free-end mounting component is completely surrounded by each sleeve component.

18. The light shelf assembly of claim 17 wherein the distal end of each spine component is sufficiently sized and shaped to be rotated to move along its axis through the opening of each free-end mounting component, and wherein the distal end of each spine component protrudes out through the opening of each free-end mounting component and is threaded onto a nut.

19. The light shelf assembly of claim 18 wherein, when the nut is torqued, tension is placed on the spine component by pushing against the free-end mount component, which in turn pushes against the sleeve component, which pushes against the interior wall of the building.

20. The light shelf assembly of claim 13 further comprising:
at least two end cap components each of which is capable of engaging the distal end of one of the sleeve components,
wherein each of the end cap components includes at least one aperture for receiving a fastener; and wherein the end cap component is secured to the free-end mounting component.

21. The light shelf assembly of claim 20 further comprising a plurality of fasteners.

22. The light shelf assembly of claim 21 wherein, when fasteners are positioned through the apertures of each end cap component and into the apertures of each free-end mounting component, and the fasteners are tightened, there is a pulling tensile force on each spine component and a pushing compressive force on each end cap component, which in turn pushes on each sleeve component creating compression in each sleeve component.

23. A method of installing a light shelf assembly comprising:

securing a first wall mounting component to an interior wall of a building, wherein the first wall mounting component includes an internally threaded opening;

rotating a threaded proximal end of a first spine component into the threaded opening of the first wall mounting component to secure the first spine component to the wall mounting component;

securing a first free-end mounting component to a threaded distal end of the first spine component, wherein the first free-end mounting component includes an internally threaded opening and at least one aperture;

positioning a first sleeve component over the first spine component, wherein the first sleeve component includes an indentation sufficiently designed to hold a first side surface of a light shelf;

securing a second wall mounting component to an interior wall of a building, wherein the second wall mounting component includes an internally threaded opening;

rotating a threaded proximal end of a second spine component into the threaded opening of the second wall mounting component to secure the second spine component to the wall mounting component;

securing a second free-end mounting component to a threaded distal end of the second spine component, wherein the second free-end mounting component includes an internally threaded opening and at least one aperture;

positioning a second sleeve component over the second spine component, wherein the second sleeve component includes an indentation sufficiently designed to hold a second side surface of a light shelf;

slidably positioning a first side surface and a second side surface of a light shelf in the indentations of the first sleeve component and the second sleeve component such that a back edge surface of the light shelf is disposed flush against the interior wall of the building;

positioning a first end cap component at a distal end of the first sleeve component, wherein the first end cap component includes at least one aperture;

rotating at least one first fastener through the at least one aperture of the first end cap and into the at least one aperture of the first free-end mounting component;

tightening the at least one first fastener to create a pulling tensile force on the first spine component and a pushing compressive force on the first end cap component, which in turn pushes on the first sleeve component creating compression in the first sleeve component;

rotating at least one second fastener through the at least one aperture of the second end cap and into the at least one aperture of the second free-end mounting component; and tightening the at least one second fastener to create a pulling tensile force on the second spine component and a pushing compressive force on the second end cap component, which in turn pushes on the second sleeve component creating compression in the second sleeve component.

* * * * *